United States Patent [19]

Kusaka

[11] Patent Number: 5,589,909
[45] Date of Patent: Dec. 31, 1996

[54] AUTOMATIC FOCUS ADJUSTMENT CAMERA WITH HIGH SPEED SEQUENTIAL PHOTOGRAPHY CAPABILITY, AND METHOD OF AUTOMATIC FOCUS ADJUSTMENT THEREFOR

[75] Inventor: Yosuke Kusaka, Yokohama, Japan

[73] Assignee: Nikon Corporation, Tokyo, Japan

[21] Appl. No.: 360,443

[22] Filed: Dec. 21, 1994

[30] Foreign Application Priority Data

Dec. 24, 1993 [JP] Japan .................................. 5-328334

[51] Int. Cl.⁶ .................................................. G03B 13/36
[52] U.S. Cl. ............................................ 396/96; 396/128
[58] Field of Search ...................................... 354/402, 406, 354/407, 408

[56] References Cited

U.S. PATENT DOCUMENTS

| | | | |
|---|---|---|---|
| 4,459,006 | 7/1984 | Sakai et al. | 354/406 |
| 4,523,829 | 6/1985 | Eguchi et al. | 354/406 |
| 4,561,749 | 12/1985 | Utagawa | 354/406 |
| 4,573,784 | 3/1986 | Suzuki | 354/406 |
| 4,792,668 | 12/1988 | Akashi et al. | 354/408 |
| 4,831,403 | 5/1989 | Ishida et al. | 354/402 |
| 5,053,799 | 10/1991 | Akashi | 354/402 |

Primary Examiner—W. B. Perkey
Attorney, Agent, or Firm—Oliff & Berridge

[57] ABSTRACT

During normal photographic operation, an image of a target object to be photographed is formed from a ray bundle from it which has passed through a photographic optical system, and is then converted into target object image data in correspondence to the distribution of intensity of illumination therein. Then a first calculation process is performed upon the target object image data to detect the focus adjustment state of the photographic optical system, and the photographic optical system is driven based upon the thus detected focus adjustment state. On the other hand, during sequential photographic operation, instead of this first calculation process, a second and different calculation process is performed upon the target object image data to detect the focus adjustment state of the photographic optical system, and the photographic optical system is driven based upon the thus detected focus adjustment state. The scope of the second calculation process may desirably be less than the scope of the first calculation process.

12 Claims, 14 Drawing Sheets

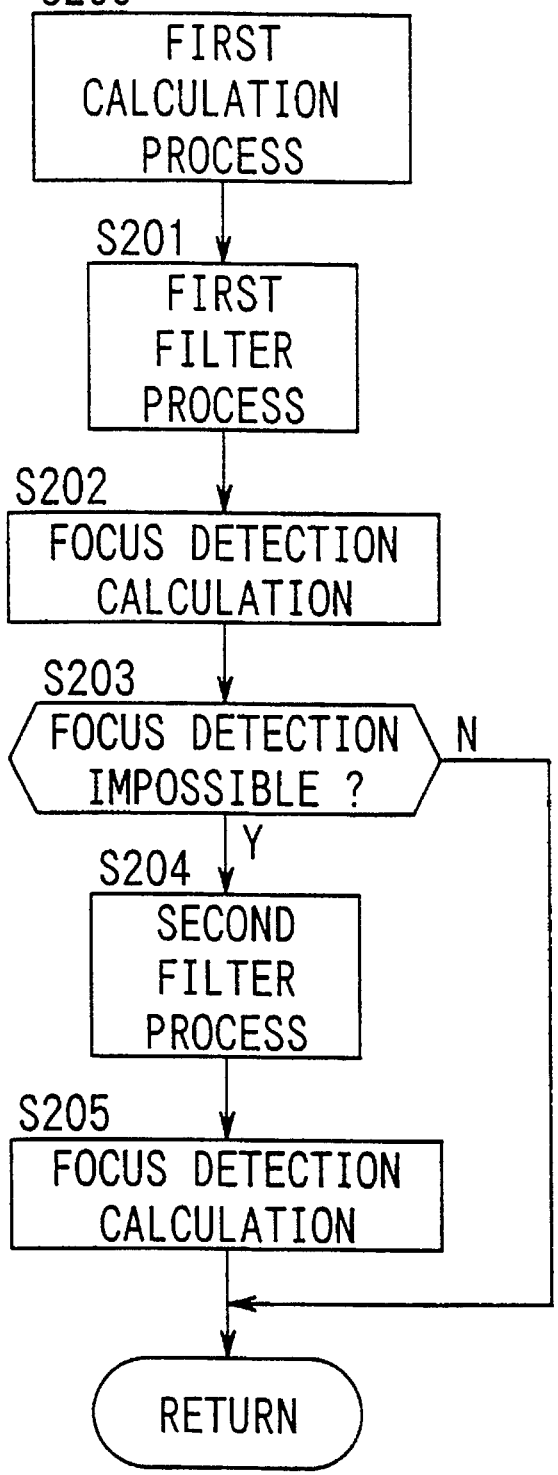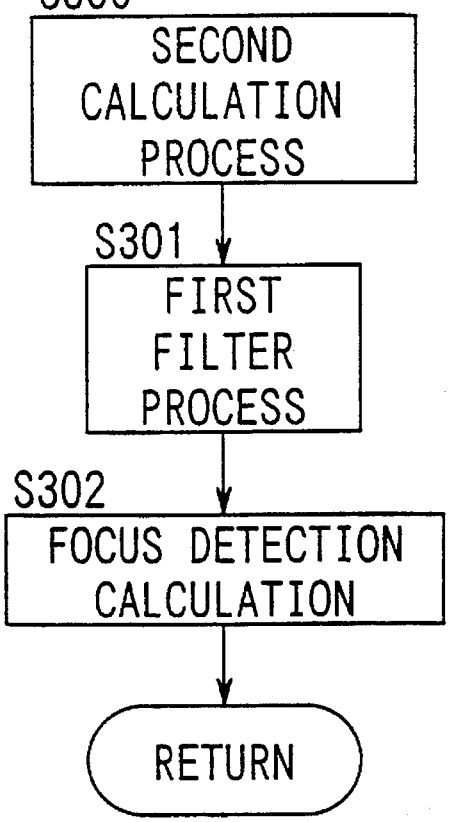

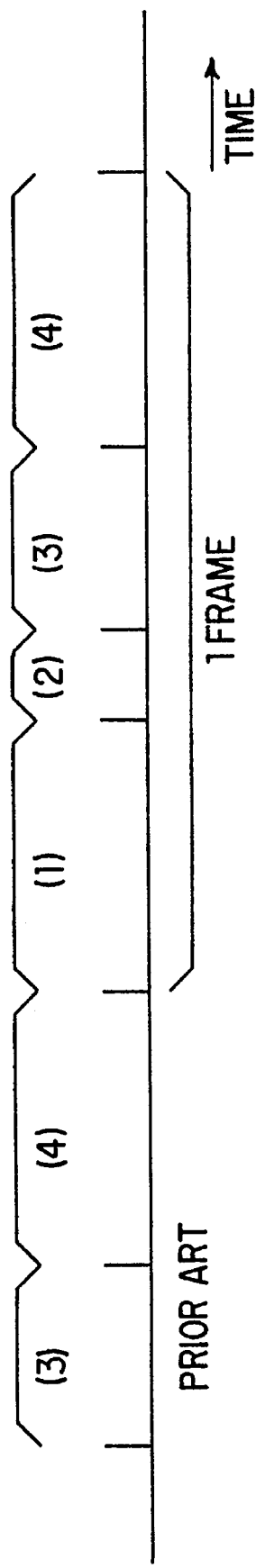
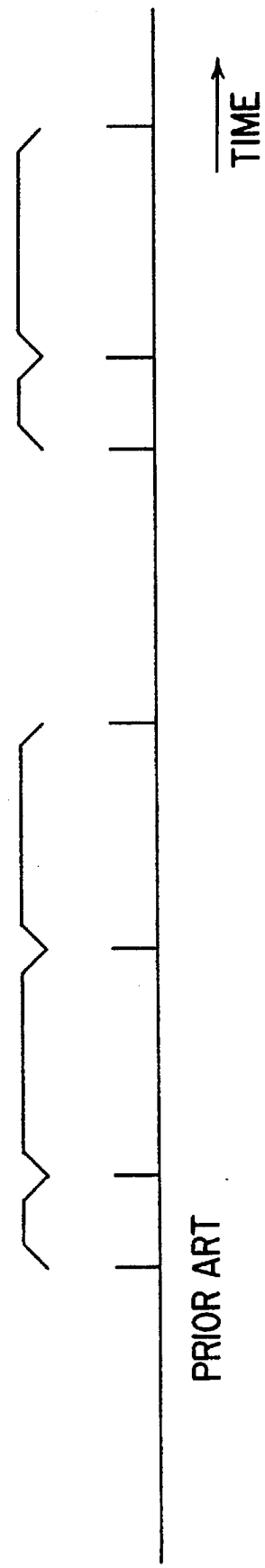
FIG.14A PRIOR ART
FIG.14B PRIOR ART

AUTOMATIC FOCUS ADJUSTMENT CAMERA WITH HIGH SPEED SEQUENTIAL PHOTOGRAPHY CAPABILITY, AND METHOD OF AUTOMATIC FOCUS ADJUSTMENT THEREFOR

BACKGROUND OF THE INVENTION

1. Field of the Invention

The present invention relates to an automatic focus adjustment camera which is capable of sequential photography, and to a method of performing automatic focus adjustment for a camera, suitable for practice during sequential photography.

2. Description of the Related Art

An automatic focus adjustment camera is per se known, in which focusing of the optical system for photography is accomplished by an image of the object to be photographed being cast by a focus detection optical system upon an image sensor of a per se known charge accumulation type, by appropriate calculation processing being performed upon the output of this image sensor—thereby detecting the amount of defocusing of the image at a previously determined focal plane of the photographic optical system—and by a focusing lens being driven according to this detected defocusing amount, so as to bring the image of the object to be photographed into focus at the focal plane.

Further, a sequential photography device for a camera is per se known, which operates the camera mirror and shutter while progressively winding on the film through a sequence of film frames, so as to perform sequential photography.

However, if such a sequential photography device is fitted to an automatic focus adjustment camera of the type described above, then, when sequential photography is performed in the automatic focus adjustment mode, since during the film frame interval between the completion of the shooting of each film frame and the shooting of the next film frame the focus adjustment process of calculation processing etc. is performed in the same manner as during normal photography in which a single film frame only is shot, the problem arises that high speed sequential photography becomes impossible, due to the length of this focus adjustment time period (equal to the time period required for focus adjustment calculation processing plus the time period required for actually driving the photographic lens) which overflows the desired time interval between shooting consecutive film frames.

This problem will now be explained in detail with reference to FIGS. 14A, 14B, 15A, and 15B, which refer to the prior art.

FIG. 14A is a time chart showing the sequence of operation of a prior art camera when performing sequential photography. For the shooting of one film frame, the following actions are performed in sequence: (1) the mirror is raised; (2) the shutter is operated and exposure is performed; (3) the mirror is lowered; and (4) the film is wound on and the shutter is recharged. And, in order to perform sequential photography, this operational sequence is repeatedly executed. Further, FIG. 14B is a time chart showing the automatic focus adjustment sequence (hereinafter abbreviated as the AF sequence) during sequential photography in synchronization with the operational sequence shown in the FIG. 14A time chart. When the lowering of the mirror (in the FIG. 14A time chart) has been completed, it is possible for the charge accumulation operation of the image sensor for focus detection (in the FIG. 14B time chart) to be commenced. Next, when this charge accumulation operation has been completed, it is possible for the signal representing the image of the object to be photographed to be read out of the image sensor, so that the calculation process for focus detection which determines the amount of defocusing of the optical system for photography can be commenced. And next, when this calculation process has been completed and an lens drive amount for driving the focusing lens has been derived according to the calculated defocusing amount, it is possible for driving of the focusing lens to be commenced. Furthermore, if in this AF sequence (in the FIG. 14B time chart) the operation of driving the focusing lens has not been completed by the time point in the operation sequence (in the FIG. 14A time chart) for the starting of exposure and shutter operation for the next film frame, then the driving of the focusing lens is discontinued at this time point.

When sequential photography of a moving subject is being performed, it is necessary to drive the focusing lens for each film frame, in order to achieve satisfactory focusing operation. FIG. 15A is a time chart showing the operational sequence of a prior art camera when performing high speed sequential photography, and in this figure the time period allotted for performing the film winding on and shutter recharging operation is shorter than in the time chart of FIG. 14A. If an attempt is made to implement an AF sequence of the type shown in FIG. 14B together with this type of camera operational sequence during high speed sequential photography, it becomes impossible to maintain the time period for driving the focusing lens at the length shown in FIG. 14B; in other words, not enough time is available for proper focusing operation. The only way in which, with an operational sequence for high speed sequential photography of the type shown in FIG. 15A, the time period for driving the focusing lens can be maintained at the length shown in FIG. 14B, is for the time period for performing the calculation process for focus detection to be shortened, as shown in FIG. 15B.

SUMMARY OF THE INVENTION

The objective of the device aspect of the present invention is to propose an automatic focus adjustment camera in the operation of which the time period for performing the calculations for focus detection during sequential photography is reduced, so that the high speed sequential photography capability is enhanced; and the objective of the method aspect of the present invention is to propose a method of performing automatic focus adjustment for a camera, with which this calculation time period is reduced.

According to its device aspect, the present invention proposes an automatic focus adjustment camera, comprising: a sequential photography device which performs photographic action sequentially; a photographic optical system, which is driven so as to be focused; an image sensor which outputs target object image data corresponding to the distribution of intensity of illumination in an image of a target object to be photographed; a focus detection optical system which forms said image of said target object on said image sensor from a ray bundle from said target object which has passed through said photographic optical system; a focus detection device which detects the focus adjustment state of said photographic optical system by: when sequential photographic operation is not being performed by said sequential photography device, performing a first calculation process upon said target object image data which is output from said image sensor; and, when sequential photographic operation is being performed by said sequential photography device, performing a second calculation process, different from said first calculation process, upon said target object image data;. and a drive device which drives said photographic optical system so as to focus it, based upon the focus adjustment state detected by said focus detection device.

And, according to its method aspect, the present invention proposes a method of performing automatic focus adjustment for a camera, in which: an image of a target object to be photographed is formed from a ray bundle from said target object which has passed through a photographic optical system, and is then converted into target object image data in correspondence to the distribution of intensity of illumination therein; the focus adjustment state of said photographic optical system is detected by: when sequential photographic operation is not being performed, performing a first calculation process upon said target object image data; and, when sequential photographic operation is being performed, performing a second calculation process, different from said first calculation process, upon said target object image data; and: said photographic optical system is driven based upon the thus detected focus adjustment state.

Typically the scope of the second calculation process is less than the scope of the first calculation process. And both of these calculation processes typically involve correlation calculation processing.

Thereby, according to the present invention as described above, since typically the scope of the second calculation process practiced during sequential photography is less than the scope of the first calculation process practiced during normal photography, thereby the time period required for focus detection during sequential photography is reduced as compared with the time period required for focus detection during normal photography, and accordingly it becomes possible to perform sequential photography at high speed.

BRIEF DESCRIPTION OF THE DRAWINGS

FIG. 12 is a flow chart showing a sequence of operations executed by the microcomputer for performing a variant of the first calculation process;

FIG. 13 is a flow chart showing a sequence of operations executed by the microcomputer for performing a corresponding variant of the second calculation process;

FIGS. 14A and 14B are time charts respectively showing the operational sequence and the AF sequence of a prior art camera when performing sequential photography, for explaining the problems associated therewith; and:

DETAILED DESCRIPTION OF THE PREFERRED EMBODIMENTS

Figure 1:
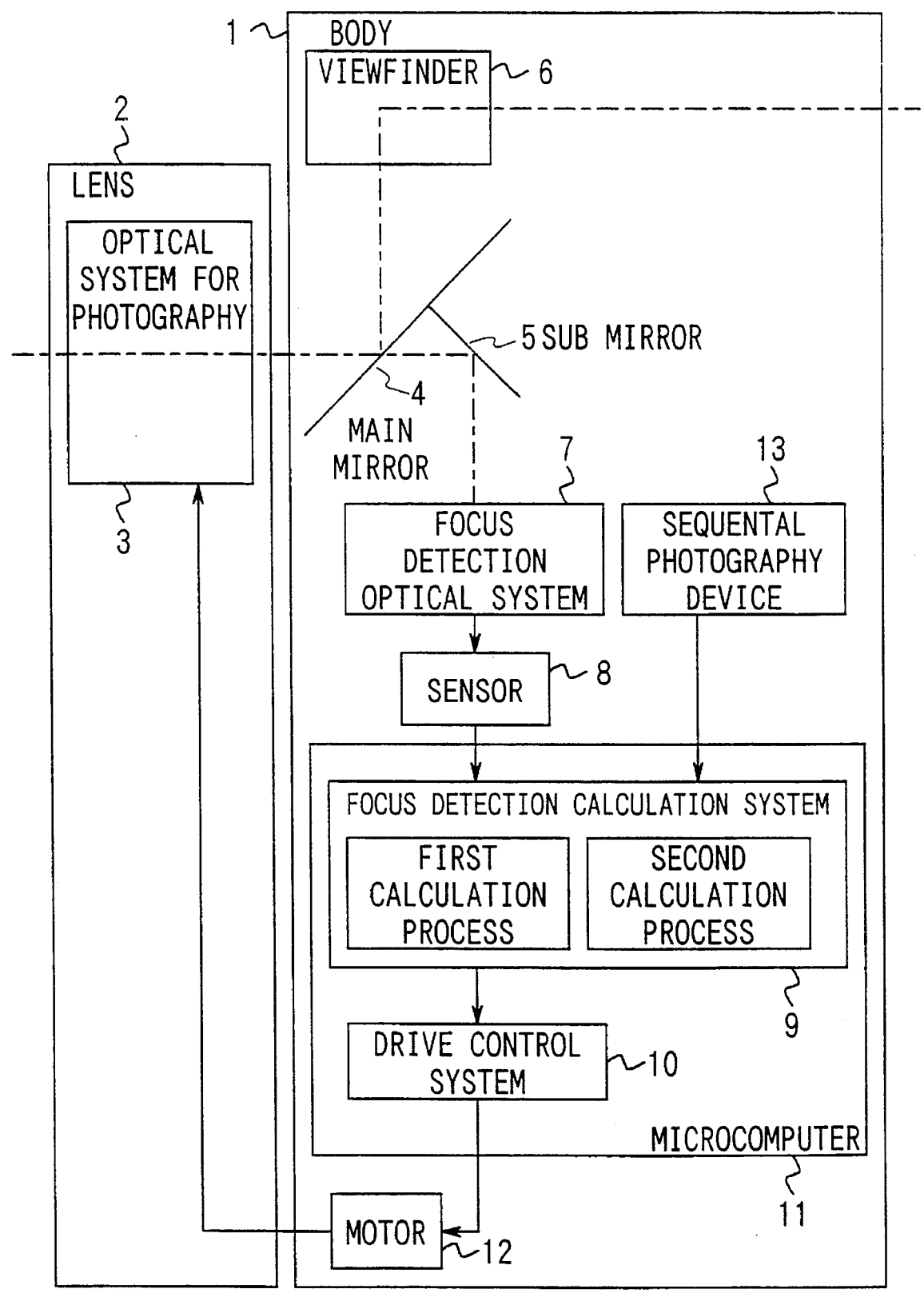
FIG. 1 is a functional block diagram showing the overall structure of the preferred device embodiment of the automatic focus adjustment camera of the present invention, which practices the preferred method embodiment.

The preferred embodiments of the device and the method of the present invention will now be explained with reference to the figures. FIG. 1 is a functional block diagram showing the overall structure of the camera which is the preferred device embodiment, and which practices the preferred method embodiment.

The camera has a camera body 1 to which a demountable lens 2 is fitted. An optical system 3 for photography is provided within the demountable lens 2, and a ray bundle (symbolically denoted in FIG. 1 by the dot-dashed line) emanates from the object to be photographed and passes through this optical system 3 for photography and falls upon a main mirror 4 which is constructed as a half silvered mirror. This main mirror 4 splits the ray bundle into two portions, a first one of which is directed to fall upon a sub mirror 5, while the other is directed to enter a viewfinder 6. The first ray bundle is deflected by the sub mirror 5 towards the bottom portion of the camera body 1, and is cast upon an optical system 7 for focus detection, which is provided in a position corresponding to a previously determined focal plane for the optical system for photography 3.

Figure 2:
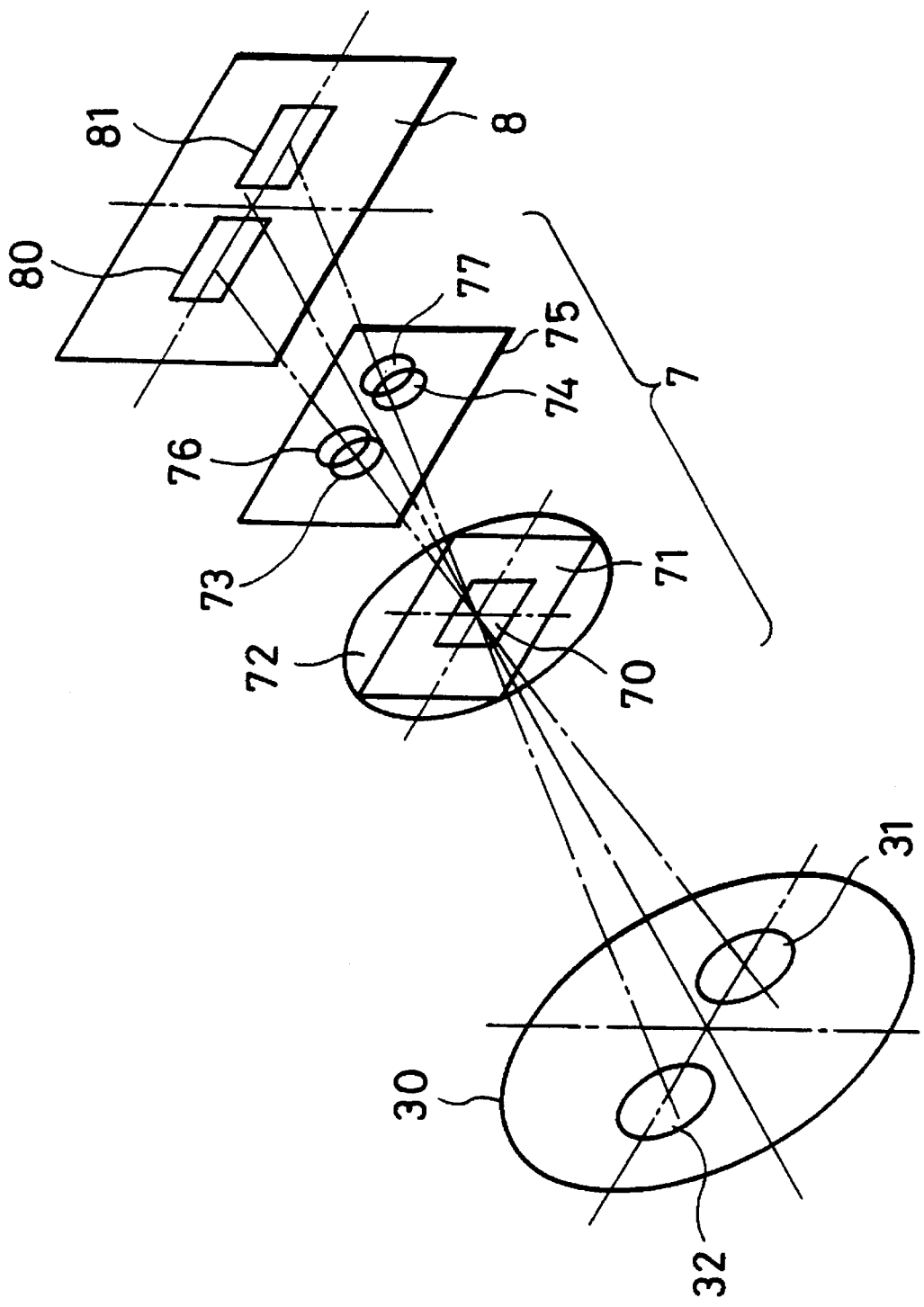
FIG. 2 is a schematic perspective view showing the overall construction of an optical system for focus detection and of an image sensor of the charge accumulation type, incorporated in this camera and shown in FIG. 1 as blocks.

FIG. 2 is a schematic perspective view showing the overall construction of the optical system 7 for focus detection and of an image sensor 8 associated therewith which is of the charge accumulation type.

The optical system for focus detection 7 comprises a visual field mask 71 through which a window 70 is pierced, a condenser lens 72, an aperture mask 75 which is formed with a pair of apertures 73 and 74, and a pair of reconverging lenses 76 and 77 which are provided just behind the pair of apertures 73 and 74 respectively. And the charge accumulation type image sensor B comprises a pair of light receiving sections 80 and 81.

The primary image of the object to be photographed which is formed in the vicinity of the window 70 on the optical axis by the optical system for photography 3 is again reconverged as a pair of secondary images upon the pair of light receiving sections 80 and 81 of the image sensor 8 by the optical system for focus detection 7, i.e. by the pair of reconverging lenses 76 and 77 thereof.

According to the above described construction, the pair of apertures 73 and 74 are projected by the condenser lens 72 upon a pair of regions 31 and 32 which are symmetrical with respect to the optical axis of the plane 30 of the vicinity of the exit pupil of the optical system for photography 3, and the ray bundles passing through these regions 31 and 32 first form a primary image in the vicinity of the visual field mask 71. The primary image which is formed at the window 70 of the visual field mask 71 further, via the condenser lens 72 and the pair of apertures 73 and 74, is reconverged by the pair of reconverging lenses 76 and 77 so as to form a pair of secondary images upon the pair of light receiving sections 80 and 81 of the charge accumulation type image sensor 8. The distribution of light intensity in this pair of secondary images is subjected to photoelectric conversion by the two light receiving sections 80 and 81, and is thus converted into a pair of electrical image signals which correspond to the object to be photographed.

Returning again to the explanation of FIG. 1, this pair of electrical image signals from the image sensor 8 which represent the target object are read in by a microcomputer 11. Next, a focus detection calculation section 9 of this microcomputer performs image displacement calculation upon these two electrical image signals so as to determine the relative positional relationship between the images of the object to be photographed which they represent, and a value DEF is obtained which represents the amount of defocusing between the actual current image plane of the optical system for photography 3 and the previously determined focal plane.

<The first focus detection calculation process, performed during normal photographic operation>

First, a calculation process for focus detection which is performed during normal photography, i.e. when sequential photography is not taking place, which hereinafter will be termed the first calculation process, will be explained with reference to FIG. 3.

The two data signals representing the image will be termed A(i) and B(i), where i runs from 1 to 20.

First, the correlation value C(L) is determined by means of the difference type algorithm of Equation (1):

$$C(L)=\Sigma |A(i+L)-B(i)| \quad (1)$$

In Equation (1), the $\Sigma$ represents summation calculation for i running from j to j+7. Further, L is an integer, and is the relative shift amount, taking as a unit the pitch of the photosensitive elements which produce the output data from the pair of light receiving sections 80 and 81. The range from which L may be selected is from −12 to +12. Further, j is a value which depends upon the shift amount L; for example, when L is zero, j may be 7.

Figure 3:
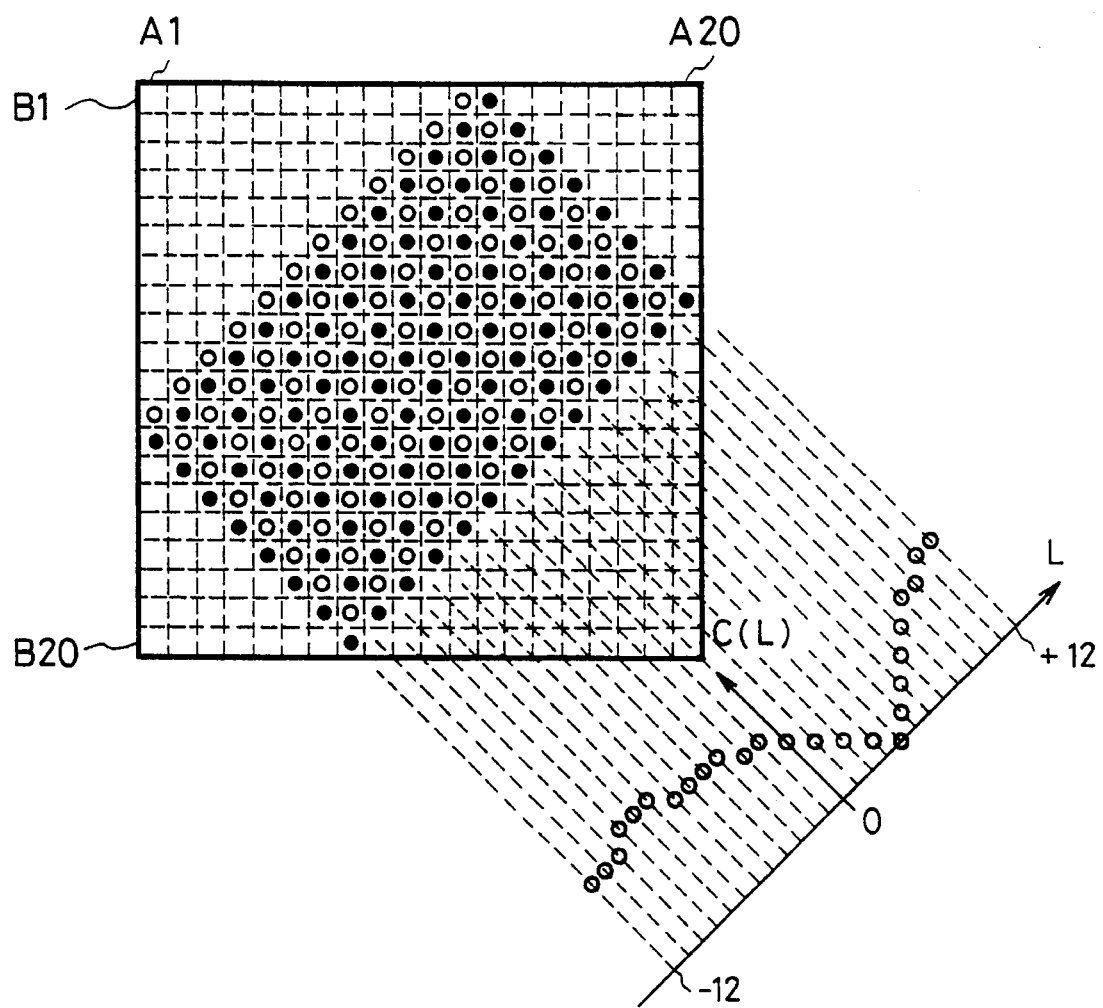
FIG. 3 is a figure for explanation of a first calculation process, employed during normal photography in the operation of this preferred embodiment.

FIG. 3 shows the progress of, and exemplary results of, a calculation according to Equation (1). In this figure, the target image data A(i) are shown along the horizontal axis, while the target image data B(i) are shown along the vertical axis, and the position of each combination for which calculation of the absolute value of the difference is performed is shown by a white circle and a black dot; these symbols are used alternatingly, only in order to enhance the viewability of the figure. Further, in this case the number of absolute difference calculations the results of which are summed together in Equation (1) is 8, as described above, and, for each value of L, the summation is performed over a row of white circles or black dots which extends in the diagonally downwards and rightwards direction as seen in the figure. The values of the correlation value C(L) which are the results of these summation calculations are shown by white circles against the corresponding shift amounts L along an axis which extends diagonally upwards and rightwards; it should be noted that a small value of the correlation value C(L) denotes high correlation.

The scope according to FIG. 3 of the first calculation process, when defined as the number of calculations in which the absolute value of the difference between the output signals from the pair of light receiving sections 80 and 81 is taken, is 25×8=200, which is the total number of white circles and black dots.

Figure 9A:
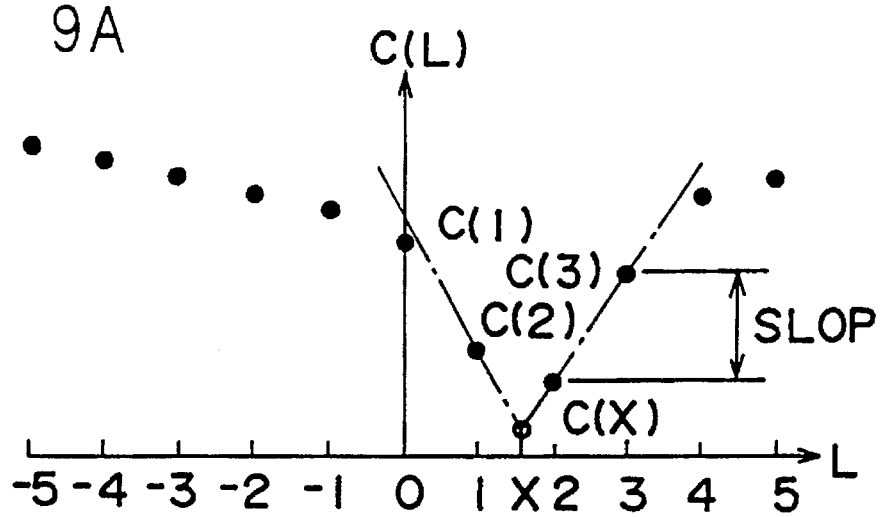
FIGS. 9A, 9B, and 9C are figures for explanation of the focus detection calculation process.
Figure 9B:
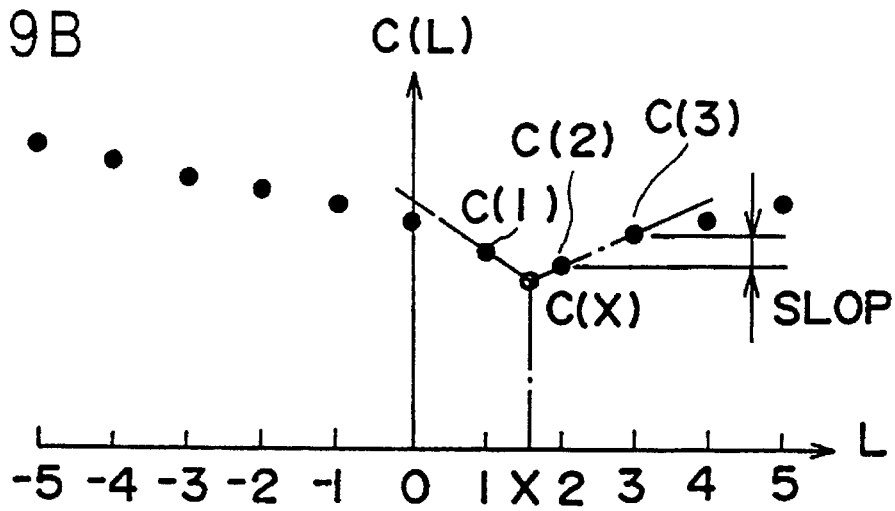
Figure 9C:
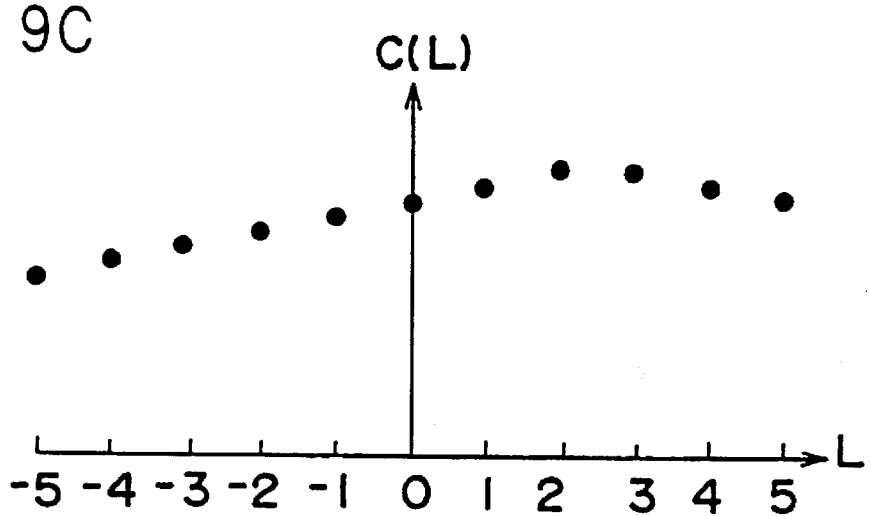

FIGS. 9(A) through 9(C) are figures for explanation of the procedure for calculation of the defocusing amount from the correlation values C(L).

As for the results of the calculations according to Equation (1), as shown in FIG. 9(A), the correlation values C(L) are low for shift amounts L=kj (in FIG. 9(A) kj=2) for which the correlation between the target image data is high. Next, according to Equations (2) through (5), the shift amount x is found which gives the minimum value C(L)min=C(x) corresponding to successive correlation values.

$$x=kj+D/SLOP \quad (2)$$

$$C(x)=C(kj)|D| \quad (3)$$

$$D=\{C(kj-1)-C(kj+1)\}/2 \quad (4)$$

$$SLOP=MAX\{C(kj+1)-C(kj), C(kj-1)-C(kj)\} \quad (5)$$

Further, based upon the shift amount x determined from the above equations, from the following Equation (6) it is possible to determine the defocusing amount DEF of the target image plane in relation to the previously defined focal plane.

$$DEF=KX \cdot PY \cdot x \quad (6)$$

In this Equation (6), PY is the pitch in the longitudinal direction of the light receiving elements of which the two light receiving sections 80 and 81 of the image sensor 8 are made up, and KX is a conversion coefficient which is determined according to the construction of the optical system 7 for focus detection.

<The second focus detection calculation process, performed during sequential photographic operation>

Now, various variants for a calculation process for focus detection which is executed while sequential photography is being performed, which hereinafter will be termed the second calculation process, will be explained with reference to FIGS. 4 through 8.

Figure 4:
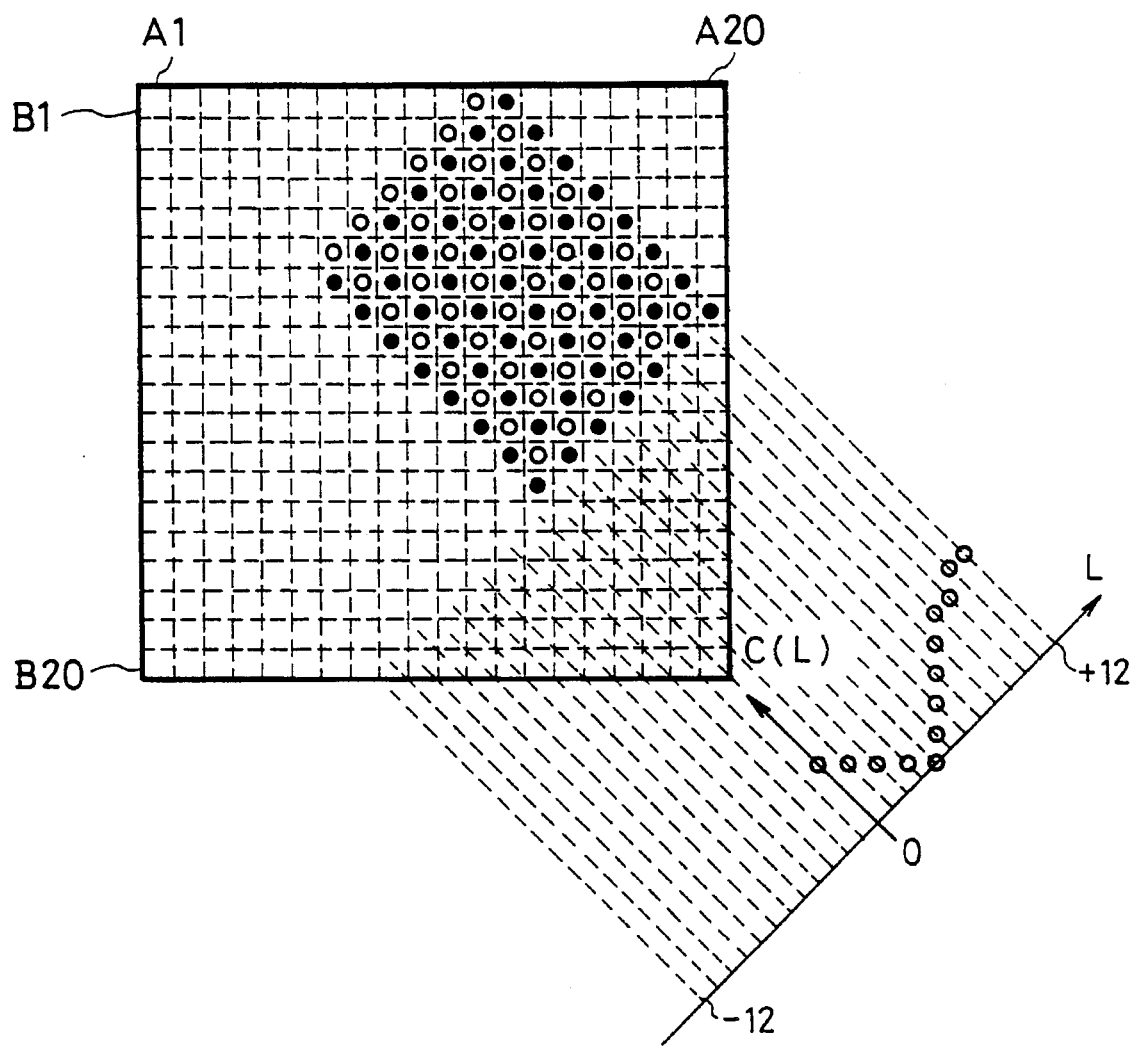
FIG. 4 is a figure for explanation of a second calculation process, employed during sequential photography in the operation of this preferred embodiment.

(1) The variant of the second calculation process in which the range for the value of the shift amount is curtailed (refer to FIG. 4)

In the first calculation process described above for focus detection during normal photography, calculation of the correlation values C(L) is performed for all integral values of the shift amount L in the range from −12 to +12, i.e. with L varying by a step of 1 over that range, for a total of 25 values. On the other hand, in this first variant of the second calculation process for focus detection during sequential photography, calculation of the correlation values C(L) is performed as shown in FIG. 4 for values of the shift amount L varying by a step of 1 over the range from 0 to +12, or alternatively over the range from −12 to 0, in either case for a total of 13 values. Which of these two ranges for the shift amount L, 0 to +12 or −12 to 0, is used, is determined according to the direction in which the focusing lens of the optical system for photography 3 was driven when focus detection is performed. For example, supposing that a positive sign for the shift amount L is defined as corresponding to forward focusing while a negative sign for the shift amount L is defined as corresponding to backward focusing, then, if the range of the shift amount L is taken as being from 0 to +12 when driving of the focusing lens is performed in the direction which alters the focused state of the photographic optical system 3 in the sense from very near to infinity while on the other hand the range of the shift amount L is taken as being from −12 to 0 when driving of the focusing lens is performed in the direction which alters the focused state of the photographic optical system 3 in the sense from infinity to very near, then it is possible to detect the out of focus extent (the defocusing amount) in the drive direction of the photographic lens. In this manner, in the shown example according to FIG. 4, the scope of the second calculation process is reduced as compared with that of the first calculation process described above, and is brought to be 13×8=104.

As an alternative, rather than as above reducing the absolute magnitude of one of the upper and the lower limits of the range for the shift amounts L to zero while leaving the other unchanged, it would also be acceptable simply to reduce the absolute magnitude of both the upper and the lower limits of the range for the shift amounts L, together. For example, it would be effective for the calculation of the correlation values C(L) only to be performed for values of the shift amount L in the range from −6 to +6.

Figure 5:
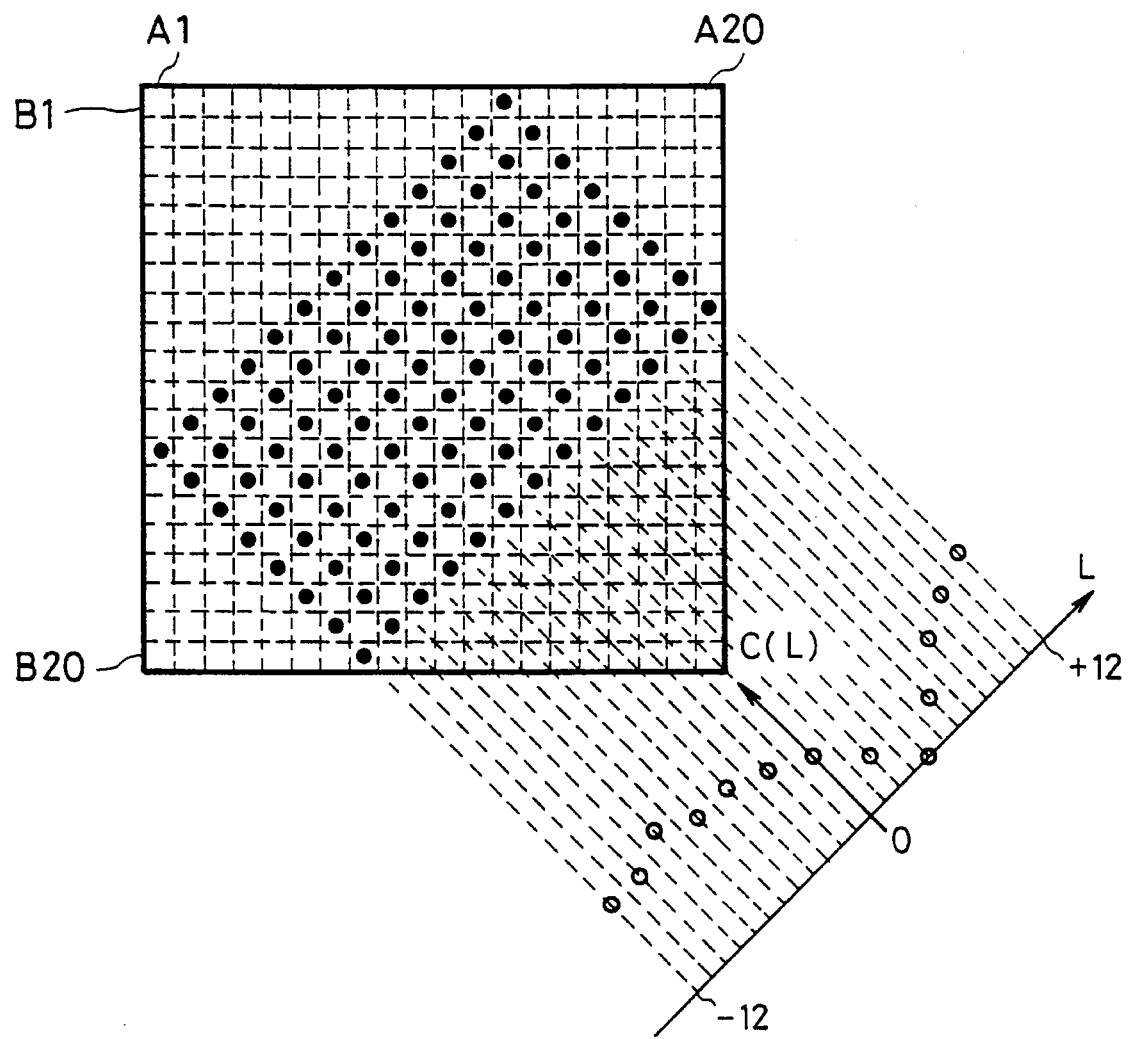
FIG. 5 is a figure for explanation of a variant of this second calculation process.

(2) The variant of the second calculation process in which the values for the shift amount are thinned out (refer to FIG. 5)

In the first calculation process described above for focus detection during normal photography, calculation of the correlation values C(L) is performed for values of the shift amount L varying by a step of 1 over the range from −12 to +12, i.e. with L assuming each integral value within that range, for a total of 25 values. On the other hand, in this second variant of the second calculation process for focus detection during sequential photography, calculation of the correlation values C(L) is performed as shown in FIG. 5 for every second integral value within this range, i.e. for L varying by a step of 2 from −12 to +12, for a total of 13 values. In this way, by performing calculation of the correlation values C(L) while increasing the step for the shift amount L, thus thinning out the values for the shift amount L, although the accuracy of focus detection is thereby deteriorated, the scope of the calculation is reduced, and thereby the time required for performing the calculation is shortened. In this manner, in the shown example according to FIG. 5, the scope of the second calculation process is reduced as compared with that of the first calculation process described above, and is brought to be 13×8=104.

Figure 6:
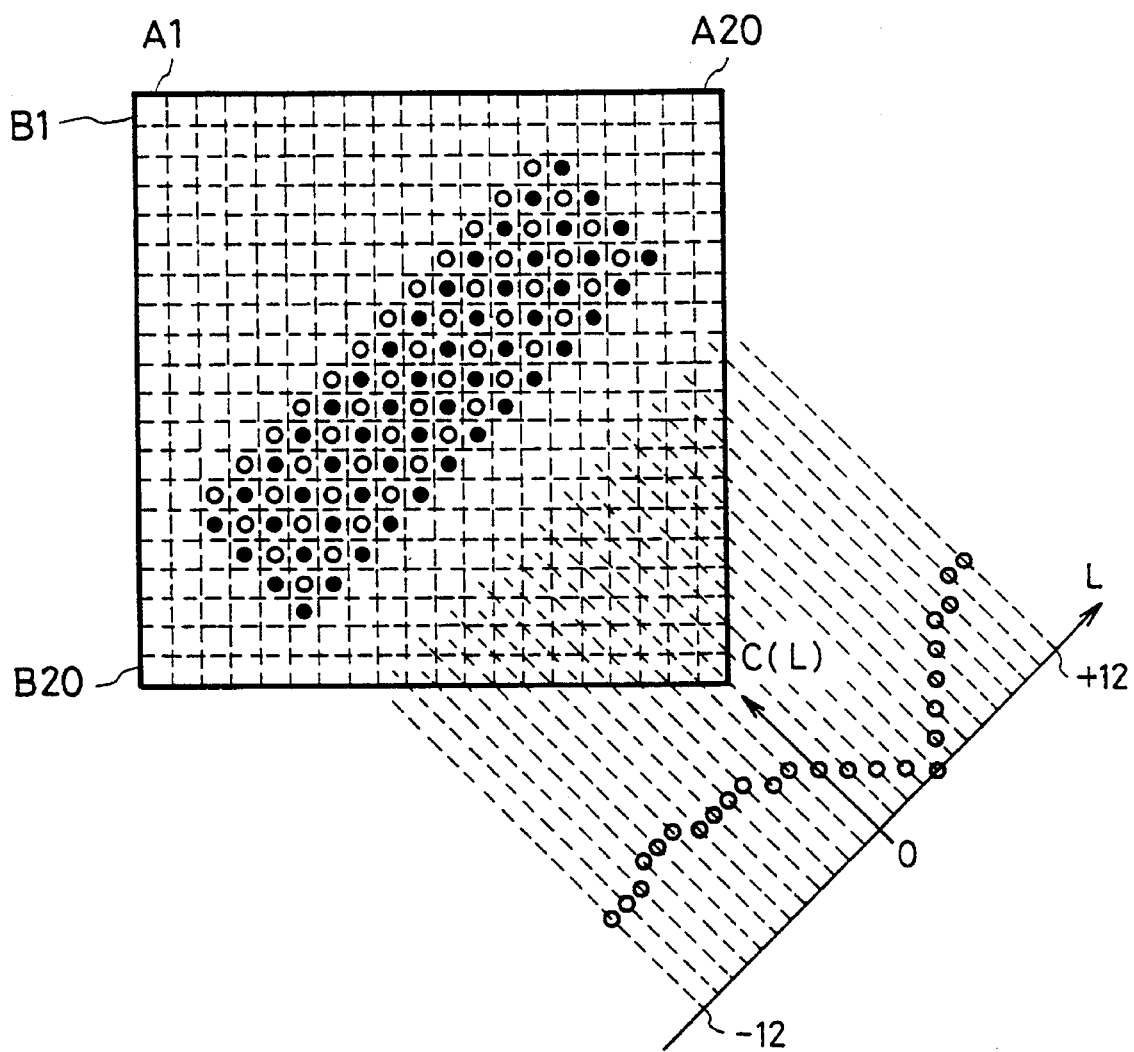
FIG. 6 is a figure for explanation of another variant of this second calculation process.

(3) The variant of the second calculation process in which the range for the target object image data is curtailed (refer to FIG. 6)

In the first calculation process described above for focus detection during normal photography, calculation of the correlation values C(L) is performed according to Equation (1) with the parameter i varying by a step of 1 through the range from j to j+7. On the other hand, in this third variant of the second calculation process for focus detection during sequential photography, calculation of the correlation values C(L) is performed as shown in FIG. 6 with the parameter i varying by a step of 1 through the range from j' to j'+3, for a total of 4 values. In this way, by performing calculation of the correlation values C(L) while curtailing the range for the target object image data, although the accuracy of focus detection is deteriorated, the scope of the calculation is reduced, and thereby the time required for performing the calculation is shortened. In this manner, in the shown example according to FIG. 6, the scope of the second calculation process is again reduced as compared with that of the first calculation process described above, and is brought to be 25×4=100.

Figure 7:
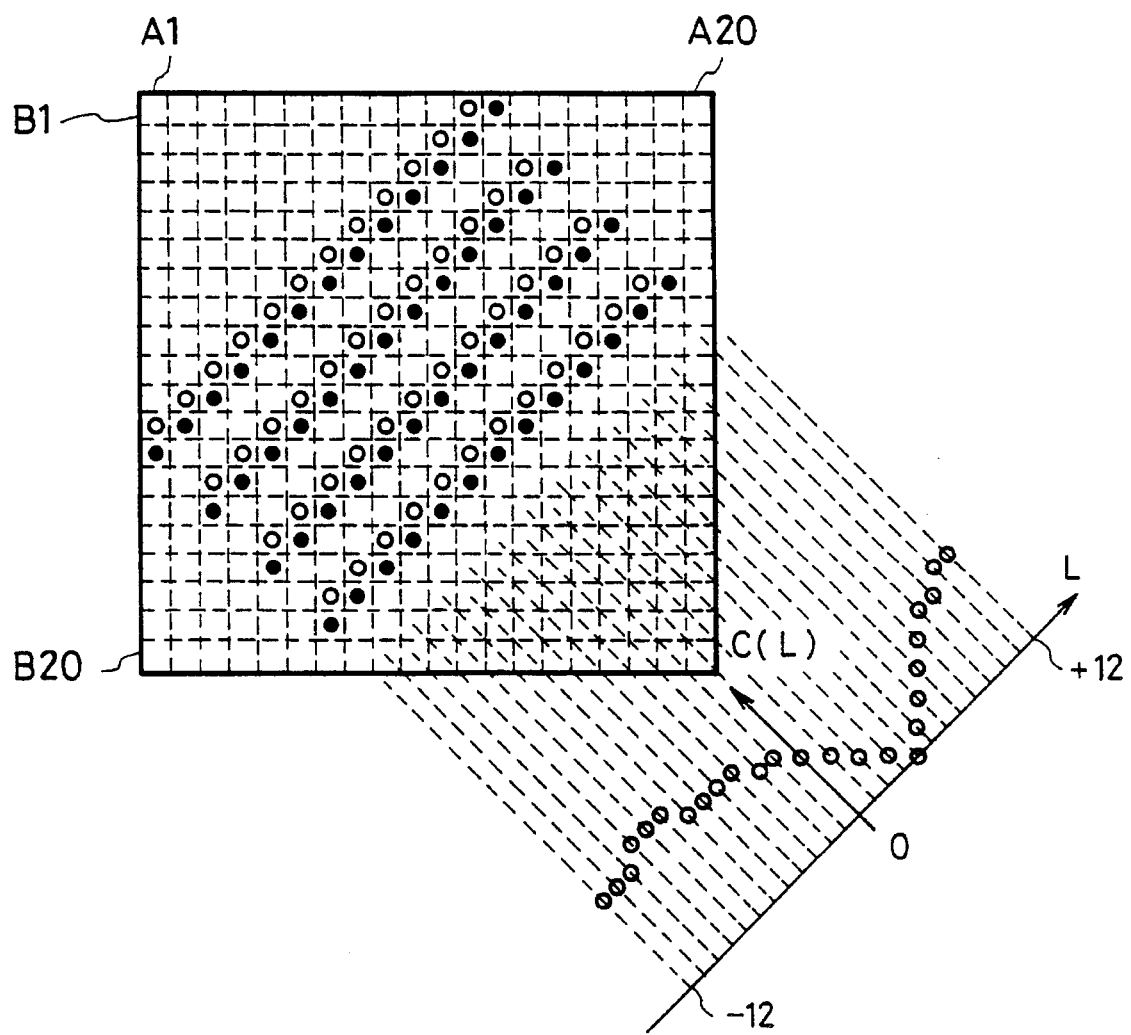
FIG. 7 is a figure for explanation of yet another variant of this second calculation process.

(4) The variant of the second calculation process in which the values for the target object image data are thinned out (refer to FIG. 7)

In the first calculation process described above for focus detection during normal photography, calculation of the correlation values C(L) is performed according to Equation (1) with the parameter i varying by a step of 1 through the range from j to j+7, i.e. with i assuming each integral value within that range. On the other hand, in this fourth variant of the second calculation process for focus detection during sequential photography, calculation of the correlation values C(L) is performed as shown in FIG. 7 for every second integral value for i within this range, i.e. for i varying by a step of 2 from j up to j+7, for a total of 4 values. In this way, by performing calculation of the correlation values C(L) while increasing the step for the parameter i, thus thinning out the target object image data values, although the accuracy of focus detection is thereby deteriorated, the scope of the calculation is reduced, and thereby the time required for performing the calculation is shortened. In this manner, in the shown example according to FIG. 7, the scope of the second calculation process is again reduced as compared with that of the first calculation process described above, and is brought to be 25×4=100.

(5) The variant of the second calculation process which combines the variants (1), (2), and (3) described above (refer to FIG. 8)

Figure 8:
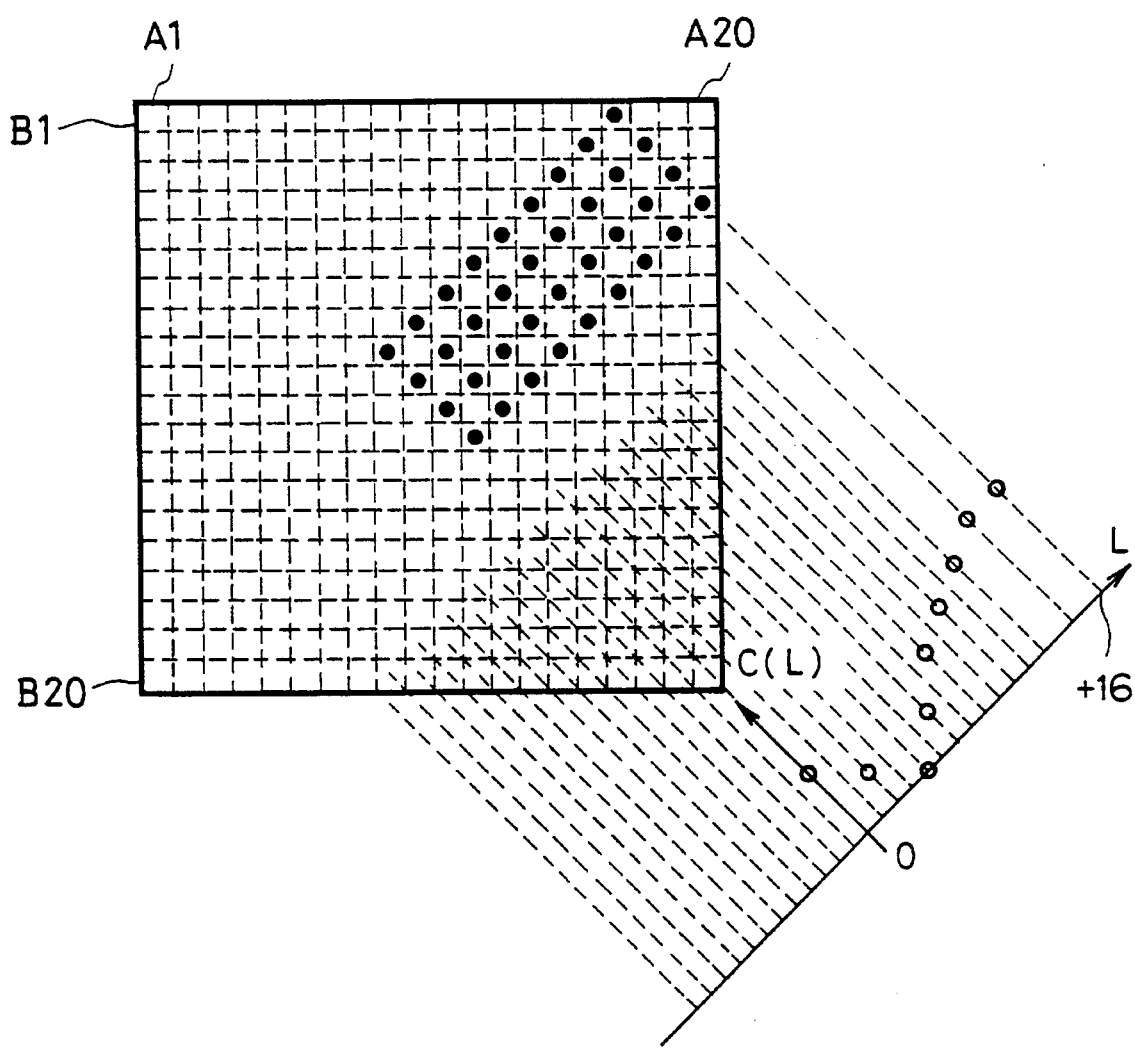
FIG. 8 is a figure for explanation of still yet another variant of this second calculation process.

In this combined variant of the second calculation process for focus detection during sequential photography, calculation of the correlation values C(L) is performed as shown in FIG. 8 with the shift value L assuming every second integral value within the range 0 to 16, i.e. for L varying by a step of 2 from 0 to +16 for a total of 9 values, and with the parameter i varying by a step of 1 through the range from j' to j'+3 for a total of 4 values. In this way, by performing calculation of the correlation values C(L) while increasing the step for the shift value L as well as reducing its range, thus both curtailing the range for the value of the shift value L and also thinning out its values, and by curtailing the range for the parameter i as well, thus reducing the number of the target object image data values, although the accuracy of focus detection is thereby rather deteriorated, the scope of the calculation is much reduced, and thereby the time required for performing the calculation is very significantly shortened. In this manner, in the shown example according to FIG. 8, the scope of the second calculation process is very much reduced as compared with that of the first calculation process described above, and is brought to be 9×4=36.

In the above explanation of the focus detection calculation process, the target image data Ai and Bi may satisfactorily be the raw data in the output signal from the image sensor 8, or alternatively may satisfactorily be first subjected to filter processing before being used.

<Decision that focus detection is not possible>

Next, the case in which it is decided that focus detection by the focus detection calculation section 9 is not possible will be explained with reference to FIGS. 9A through 9C.

As shown in FIG. 9B, the minimum value C(X) of the correlation amount is large in the event that the mutual correlation between the target object image data from the pair of light receiving sections 80 and 81 is poor. Accordingly, it is deemed that the reliability is low if the value of C(X) is greater than a predetermined value.

Or, in order to standardize C(X) according to the contrast of the target object image data, it is deemed that the reliability is low if the value which is the smoothed value of C(X) divided by SLOP which is a value proportional to the contrast, is greater than a predetermined value.

Or, if the value SLOP which is a value proportional to the contrast is less than a predetermined value, then the object to be photographed is low in contrast, and it is deemed that the reliability of the calculated defocusing amount DEF is low.

Further, if the correlation of the target object image data is poor, as shown in FIG. 9(C), the correlation value C(L) may not fall within the shift range, and it may not be possible to determine a minimum value for C(X). In this type of case, it is deemed that focus detection is not possible.

The explanation will now revert to the FIG. 1 structure.

Provided that it is not deemed by the focus detection calculation section 9 that focus detection is not possible, a drive control section 10 which is incorporated within the microcomputer 11 controls a motor 12 so as to drive it in a rotational direction and by a rotational amount which are determined according to the defocusing amount DEF which has been calculated by the focus detection calculation section 9. The motor 12 is linked to the drive system for the focusing lens of the optical system for photography 3 so as to drive this focusing lens along the optical axis, and is operated so as to reduce the defocusing amount DEF effectively to zero, thus bringing the optical system 3 to the properly focused state.

A sequential photography device 13 is a device for controlling the action of the camera as a whole during sequential photography, and controls the actuation of a shutter, a film forwarding device, a mirror drive device, a shutter recharging device and the like (none of which are shown in the figures) according to a proper operational sequence for the camera during sequential photography. Moreover, when sequential photography is being performed, a signal indicating sequential photography is sent from this sequential photography device 13 to the focus detection calculation section 9. During sequential photography, in response to this sequential photography signal, the focus detection calculation section 9 performs one of the above described variants of the second calculation process described above, so that the scope of the calculations for focus detection is relatively reduced, and thereby the time required for performing the calculations is shortened; but as described above the accuracy of these calculations may be somewhat deteriorated. On the other hand, when sequential photography is not being performed, i.e. during normal photography, the focus detection calculation section 9 performs the first calculation process described above, so that normal focus detection takes place with the usual high accuracy.

In this manner, the time required for performing the calculations can be shortened by performing a focus detection calculation process during sequential photography for which the scope of the calculations is relatively restricted, and thereby, according to the device and method of the present invention, it becomes possible to perform automatic focus adjustment of the optical system for photography 3 even if high speed sequential photographic operation is being performed.

Figure 10:
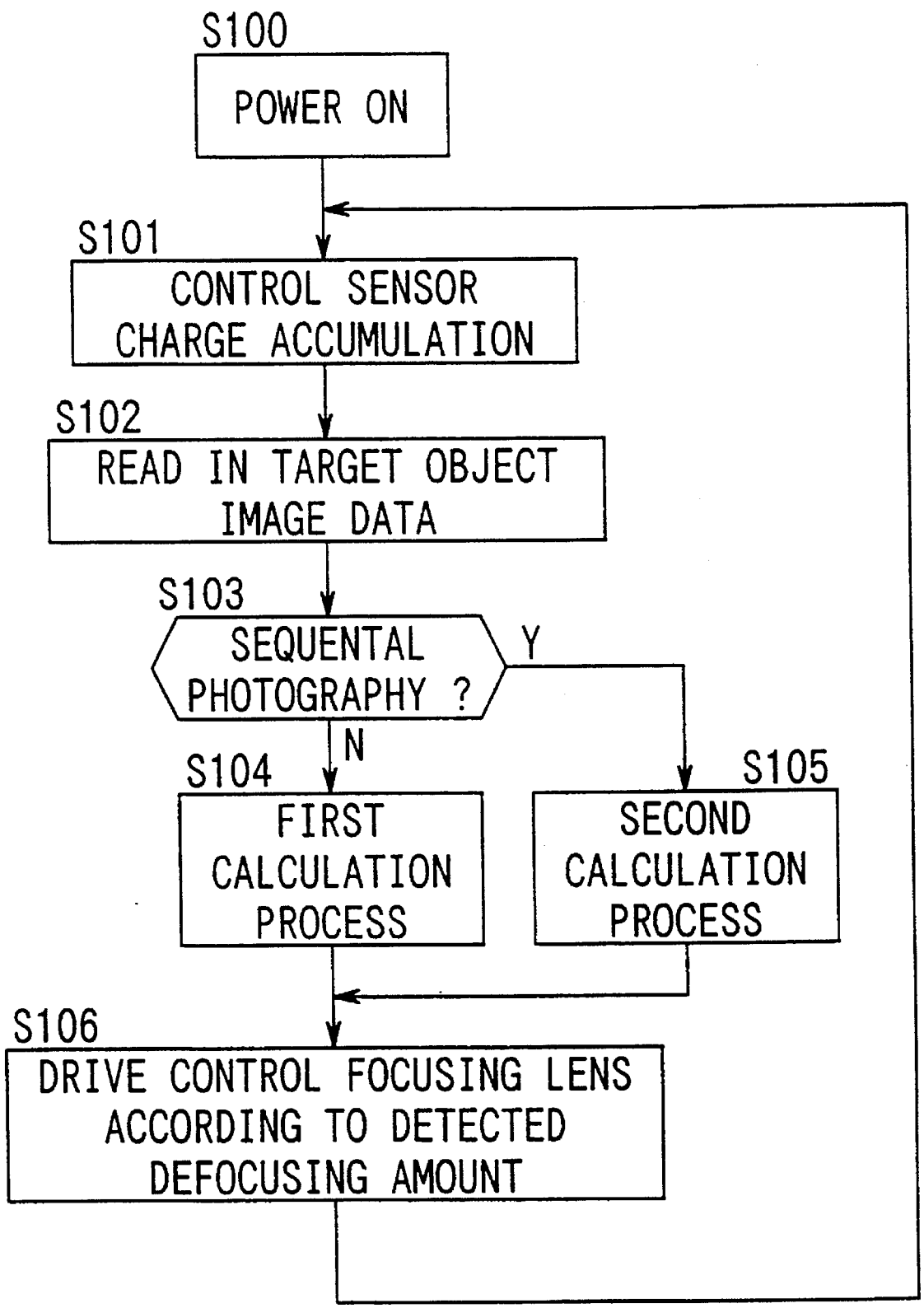
FIG. 10 is a flow chart showing a sequence of operations executed by a microcomputer incorporated in the FIG. 1 camera.

FIG. 10 is a flow chart showing the operation of the microcomputer 11 in order to execute the functions schematically shown in FIG. 1 as the focus detection calculation section 9 and the drive control section 10. The operation of the preferred embodiment of the camera of the present invention for focus adjustment, according to the preferred method embodiment, will now be explained with reference to this flow chart.

In the step S100 the power to the camera is turned on, and the flow of control proceeds to the step S101, in which charge accumulation by the charge accumulation type image sensor 8 is performed. Next, in the step S102, the microcomputer 11 reads in from the image sensor 8 the target object image data as described above, and the flow of control proceeds to the step S103, in which a decision is made as to whether or not the sequential photography mode is currently set. If the sequential photography mode is currently set then the flow of control is transferred to the step S105, while if the sequential photography mode is not currently set then the flow of control proceeds to the step S104. When sequential photography is not being performed, then in the step S104 the microcomputer 11 executes the above described first calculation process upon the target object image data and calculates a defocusing amount DEF. On the other hand, when sequential photography is being performed, then in the step S105 the microcomputer 11 executes the above described second calculation process upon the target object image data and calculates a defocusing amount DEF. After both of these steps, the flow of control continues to the step S106, in which, provided that it has not been deemed that focus detection is not possible, a drive amount for the focusing lens of the optical system for photography 3 is determined upon based upon the defocusing amount DEF which has been calculated, and then the motor 12 is drive controlled so as to drive this focusing lens along the optical axis to a position in which the optical system for photography 3 is properly focused. When this driving of the focusing lens has been completed, the flow of control returns to the step S101, and the above described process is repeated. On the other hand, when it is deemed that focus detection is not possible, the flow of control returns to the step S101 without the focusing lens being driven.

Moreover, in the step S101, before the beginning of the charge accumulation process, a check is performed to ensure that the main mirror 4 is in its lowered position, and if the main mirror 4 is still raised then the commencement of the charge accumulation process is delayed until in fact the main mirror 4 has reached its lowered position. Further, the driving of the focusing lens of the optical system for photography 3 is forcibly terminated after the commencement of exposure operation.

Although in the above described preferred embodiment of the present invention the second calculation process is selected when, and only when, sequential photography is being performed, as a modification it would also be possible to consider conditions related to the intensity of light from the target object to be photographed. In such a case, the second calculation process may be selected only when sequential photography is being performed and also the intensity of light in the target object image is relatively low, in which case the time period for charge accumulation becomes relatively long.

Further, although in the above described preferred embodiment of the present invention the first calculation process is always selected when normal photography is being performed, as another modification it would also be possible to consider conditions related to the intensity of light from the target object to be photographed. In such a case, the second calculation process may be selected either when sequential photography is being performed, or, even during normal photography, when the intensity of light in the target object image is relatively low, in which case the time period for charge accumulation becomes relatively long.

Although in the above described embodiments of the calculation processes for the correlation values C(L), shown in FIG. 3 through FIG. 8 and described above, it was described that the correlation values C(L) were calculated for shift values always over an entire shift range which is predetermined in advance, this is not to be considered as being limitative of the present invention; as a modification, it would also be acceptable to terminate the correlation calculation processing at the time point at which the calculations of Equations (2) through (5) become possible, i.e. when the proper focus point is found. For example, referring to FIG. 9(A), if the correlation calculations are performed in the order C(0), C(1), C(−1), C(2), C(−2), . . . , i.e. starting at 0 as a central point and thenceforth setting the shift value L alternatingly plus and minus with its value increasing, since in the shown example the calculations of Equation (2) through Equation (5) become possible at the time point when the values up to C(3) have been obtained, the remaining calculations for C(−3), C(4), C(−4), C(5), C(−5), . . . may be omitted.

Furthermore it would also be acceptable, in the first calculation process, to perform the calculations for the correlation values C(L) for the entire extent (in the figures, exemplarily −12 to +12) of a range for the shift value L which is determined in advance, while by contrast, in the second calculation process, terminating the calculations of the correlation amounts after the time point at which it becomes possible to perform the calculations of Equation (2) through Equation (5).

The reason will now be explained why it is desirable, in the first calculation process, to calculate the correlation values C(L) over the entire extent of a range for the shift value L.

Figure 11:
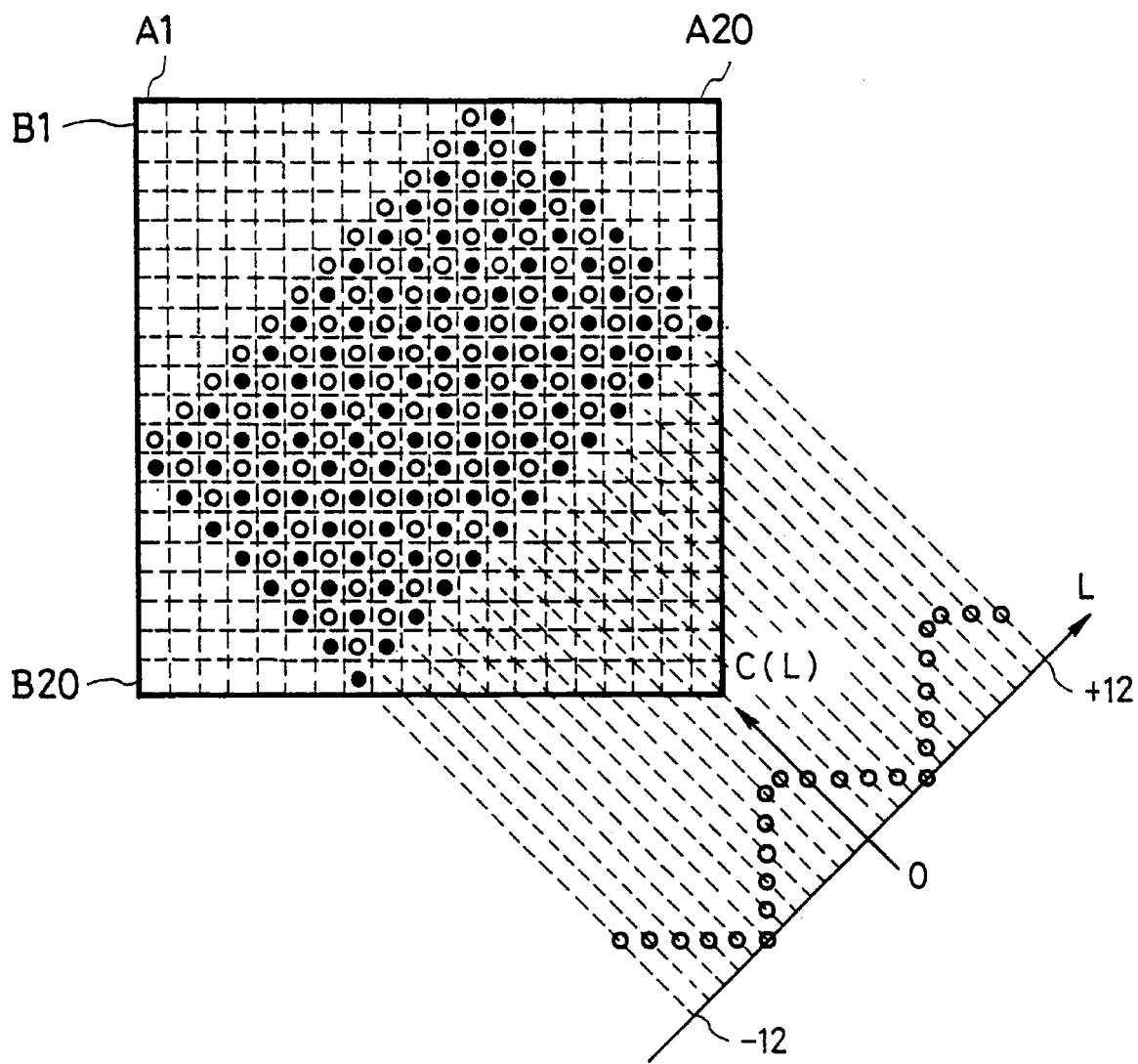
FIG. 11 is a figure for explanation of a false focusing problem associated with the first calculation process, when the image signal for the object to be photographed exhibits a periodic pattern.
Figure 15A:
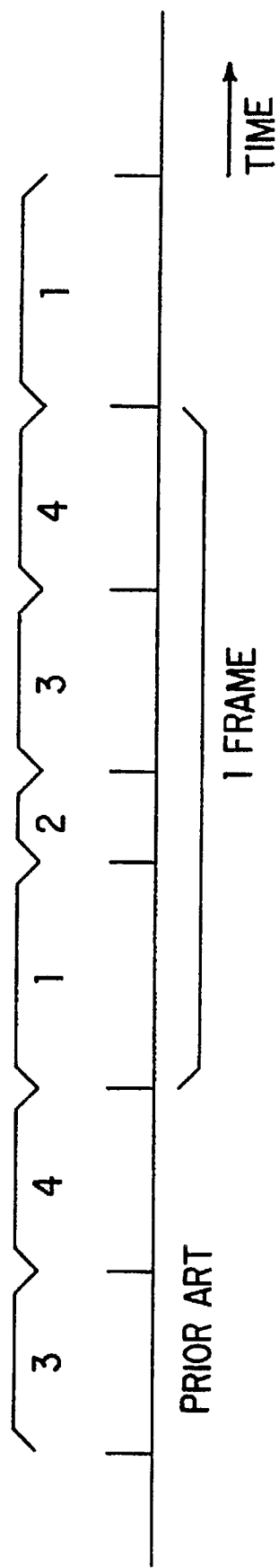
FIGS. 15A and 15B are time charts, similar to FIGS. 14A and 14B, respectively showing the operational sequence and the AF sequence of a prior art camera when performing sequential photography at high speed, for explaining the particular problems associated therewith.
Figure 15B:
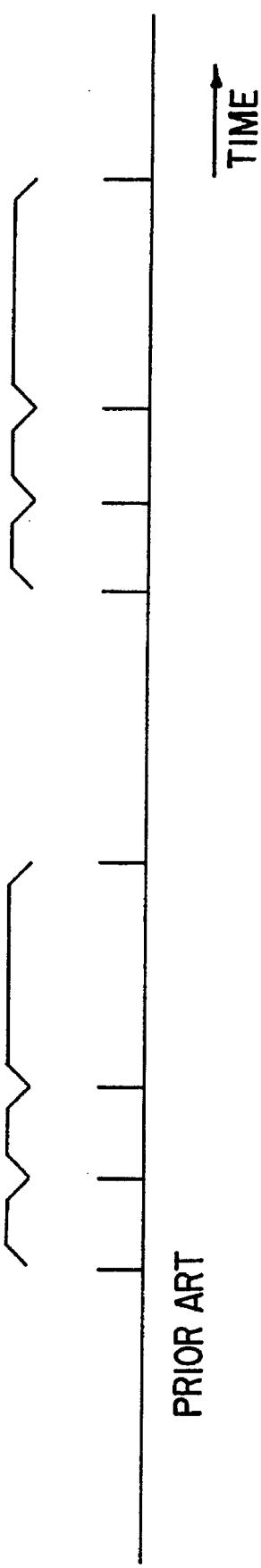

In a case such as when the distribution of light intensity over the object to be photographed exhibits a periodic pattern, as shown in FIG. 11 the correlation is good (i.e., the correlation value C(L) is low) for a plurality of values for the shift value L. Since a periodic pattern thus generates false focusing, it is necessary to conceive of some measure for preventing movement of the lens or the like. It is a necessary procedure, in order to do this, to perform correlation calculation over the entire extent of the shift range, so as to be able to decide, if the correlation is good for a plurality of values for the shift value L, that the current object to be photographed is one which exhibits a periodic pattern.

On the other hand, detection of this kind of periodic pattern is not performed in the second calculation process, in order to give priority to reducing the time period necessary for the calculations, and the correlation calculations remaining to be done after the time point at which the calculations of Equation (2) through Equation (5) become possible may advantageously be cut out.

Next a variant embodiment will be described, in which different variations of the first calculation process and of the second calculation process are performed.

First, in the first calculation process, a first filter processing operation (of a per se known type) is performed in order to extract the high frequency components from the target image data, and the data are used, after having been subjected to this first filter processing operation, for the focus detection calculations. If as a result of these calculations it is not possible to perform focus detection, then a second filter processing operation (also of a per se known type) is performed in order to extract the low frequency components from the target image data, and for a second time the focus detection calculations are performed upon the data, after they have been subjected to this second filter processing operation.

On the other hand, in the second calculation process, the above described first filter processing operation for the high frequency components is performed upon the target image data, and the data are used for the focus detection calculations after having been subjected to this first filter processing operation. However, even if as a result of these calculations it is not possible to perform focus detection, in view of the time limitations, no second filter processing operation for the low frequency components is performed upon the target image data, and no focus detection calculations are performed for a second time upon the data after subjecting them to any second filter processing operation.

FIG. 12 is a flow chart showing the operation of the microcomputer 11 in order to execute a subroutine for performing this variant for the first calculation process.

In the initial step S200 the first calculation process is initiated, and then the flow of control proceeds to the step S201 in which the first filter process for the high frequency components is performed upon the target image data. Next in the step S202 the above described correlation calculation is performed upon the data after they have been subjected to this first filter process. Then in the step S203 the above described decision is made, i.e. it is decided whether or not focus detection was possible. If the result of this decision is that focus detection was successful, then this first calculation process is complete, and accordingly the flow of control returns from this subroutine to the main routine; but, if the result of this decision is that focus detection was not possible, then the flow of control continues to the step S204. In the step S204, the second filter process for the low frequency components is performed upon the target image data. Next in the step S205 the above described correlation calculation is performed upon the data after they have been subjected to this second filter process, and then this first calculation process is complete, and the flow of control returns from this subroutine to the main routine.

FIG. 13 is a flow chart showing the operation of the microcomputer 11 in order to execute a subroutine for performing this variant for the second calculation process.

In the initial step S300 the second calculation process is initiated, and then the flow of control proceeds to the step S301 in which the first filter process is performed upon the target image data. Next in the step S302 the above described correlation calculation is performed upon the data after they have been subjected to this first filter process, and then this second calculation process is complete, and the flow of control returns from this subroutine to the main routine.

In this manner, in the case of the above described variant embodiment of the present invention which utilizes these variant examples of the first calculation process and the second calculation process, with the first calculation process, even if focus detection is not possible after filtration of the low frequency components has been performed, again detailed focus detection is performed for a second time after filtration of the high frequency components, and thereby it is possible to reduce the likelihood that focus detection will finally prove to be impossible. On the other hand, with the second calculation process, in order to assign priority to speed of the calculations, if focus detection is not possible after filtration of the low frequency components, no repeated focus detection is performed after filtration of the high frequency components.

Although the present invention has been shown and described in terms of the preferred embodiments of the device and the method thereof, and in terms of certain variants, it is not to be considered as limited by any of the perhaps quite fortuitous details of said embodiments or their variants, or of the drawings, but only by the terms of the appended claims, which follow.

I claim:

1. An automatic focus adjustment camera, comprising:
   a sequential photography device which performs photographic action sequentially;
   a photographic optical system, which is driven so as to be focused;
   a charge accumulation type image sensor which outputs target object image data corresponding to a distribution of intensity of illumination in an image of a target object to be photographed;
   a focus detection optical system which forms said image of said target object on said charge accumulation type image sensor from light from said target object which has passed through said photographic optical system;
   a time detection device which detects charge accumulation time of said charge accumulation type image sensor;
   a focus detection device which detects the focus adjustment state of said photographic optical system by:
      performing a first calculation process upon said target object image data output from said charge accumulation type image sensor when sequential photographic operation is not being performed by said sequential photography device or accumulation time of said charge accumulation type image sensor detected by said time detection device is shorter than a predetermined value; and,
      performing a second calculation process, different from said first calculation process, upon said target object image data which is output from said charge accumulation type image sensor when sequential photographic operation is being performed by said sequential photography device and accumulation time of said charge accumulation type image sensor detected by said time detection device is longer than said predetermined value; and,
   a drive device which drives said photographic optical system so as to focus it, based upon the adjustment state detected by said focus detection device.

2. An automatic focus adjustment camera according to claim 1, wherein a scope of said second calculation process is less than a scope of said first calculation process.

3. An automatic focus adjustment camera according to claim 2, wherein said focus detection optical system forms a pair of images of said target object on said image sensor from said ray bundle from said target object which has passed through said photographic optical system, said image sensor outputs a pair of sets of target object image data each corresponding to the distribution of intensity of illumination in one of said pair of images of said target object, and said focus detection device, when performing said first calculation process and said second calculation process, executes correlation calculation processing by, while relatively shifting said pair of sets of target object image data output by said image sensor, calculating an amount of mutual correlation between said pair of sets of target object image data for each shift amount.

4. An automatic focus adjustment camera according to claim 3, wherein an amount of target object image data used in correlation calculation processing in said second calculation process is less than an amount of target object image data used in correlation calculation processing in said first calculation process.

5. An automatic focus adjustment camera according to claim 4, wherein in said second calculation process only central portions of data in said pair of sets of target object image data are used.

6. An automatic focus adjustment camera according to claim 4, wherein in said second calculation process the correlation calculation processing is executed while thinning out the data in said pair of sets of target object image data.

7. An automatic focus adjustment camera according to claim 3, wherein in said second calculation process a number of times of shifting for said correlation calculation processing is less than a number of times in said first calculation process.

8. An automatic focus adjustment camera according to claim 7, wherein in said second calculation process a maximum shift value is less than in said first calculation process.

9. An automatic focus adjustment camera according to claim 7, wherein in said second calculation process a step from each shift value to a next is greater than in said first calculation process.

10. An automatic focus adjustment camera according to claim 7, wherein in said second calculation process a direction in which said pair of sets of target object image data are mutually shifted is determined according to a direction of driving of said photographic optical system.

11. An automatic focus adjustment camera, comprising:
    a sequential photography device which performs photographic action sequentially;
    a photographic optical system, which is driven so as to be focused;
    a charge accumulation type image sensor which outputs target object image data corresponding to a distribution of intensity of illumination in an image of a target object to be photographed;
    a focus detection optical system which forms said image of said target object on said charge accumulation type image sensor from light from said target object which has passed through said photographic optical system;
    a focus detection device which detects a focus adjustment state of said photographic optical system by:
       performing a first calculation process upon said target object image data output from said charge accumulation type image sensor when sequential photographic operation is not being performed by said sequential photography device; and,
       performing a second calculation process, different from said first calculation process, upon said target object image data output from said charge accumulation type image sensor when sequential photographic operation is being performed by said sequential photography device; and,
    a drive device which drives said photographic optical system so as to focus it, based upon the adjustment state detected by said focus detection device;
    wherein said first calculation process includes a process of detecting pattern periodicity of said image of the target object, and said second calculation process does not include any process of detecting pattern periodicity of said image of the target object.

12. An automatic focus adjustment camera, comprising:
    a sequential photography device which performs photographic action sequentially;
    a photographic optical system, which is driven to be focused;
    a charge accumulation type image sensor which outputs target object image data corresponding to a distribution of intensity of illumination in an image of a target object to be photographed;

a focus detection optical system which forms said image of said target object on said charge accumulation type image sensor from light from said target object that has passed through said photographic optical system;

a focus detection device which detects the focus adjustment state of said photographic optical system by:
    performing a first calculation process upon said target image data which is output from said charge accumulation type image sensor when sequential photographic operation is not being performed by said sequential photography device; and,
    performing a second calculation process, different from said first calculation process, upon said target image data output from said charge accumulation type image sensor when sequential photographic operation is being performed by said sequential photography device; and, a drive device which drives said photographic optical system to focus it, based upon the adjustment state detected by said focus detection device;

wherein said first calculation process includes a process of focus detecting upon high frequency components of said target image data and a process of focus detecting upon low frequency components of said target object image data, and said second calculation process includes a process of focus detect upon high frequency components of said target object image data but does not include a process of focus detecting upon low frequency components of said target image data.

* * * * *